No. 882,552. PATENTED MAR. 24, 1908.
H. G. CORDLEY.
WATER COOLER.
APPLICATION FILED DEC. 19, 1906.
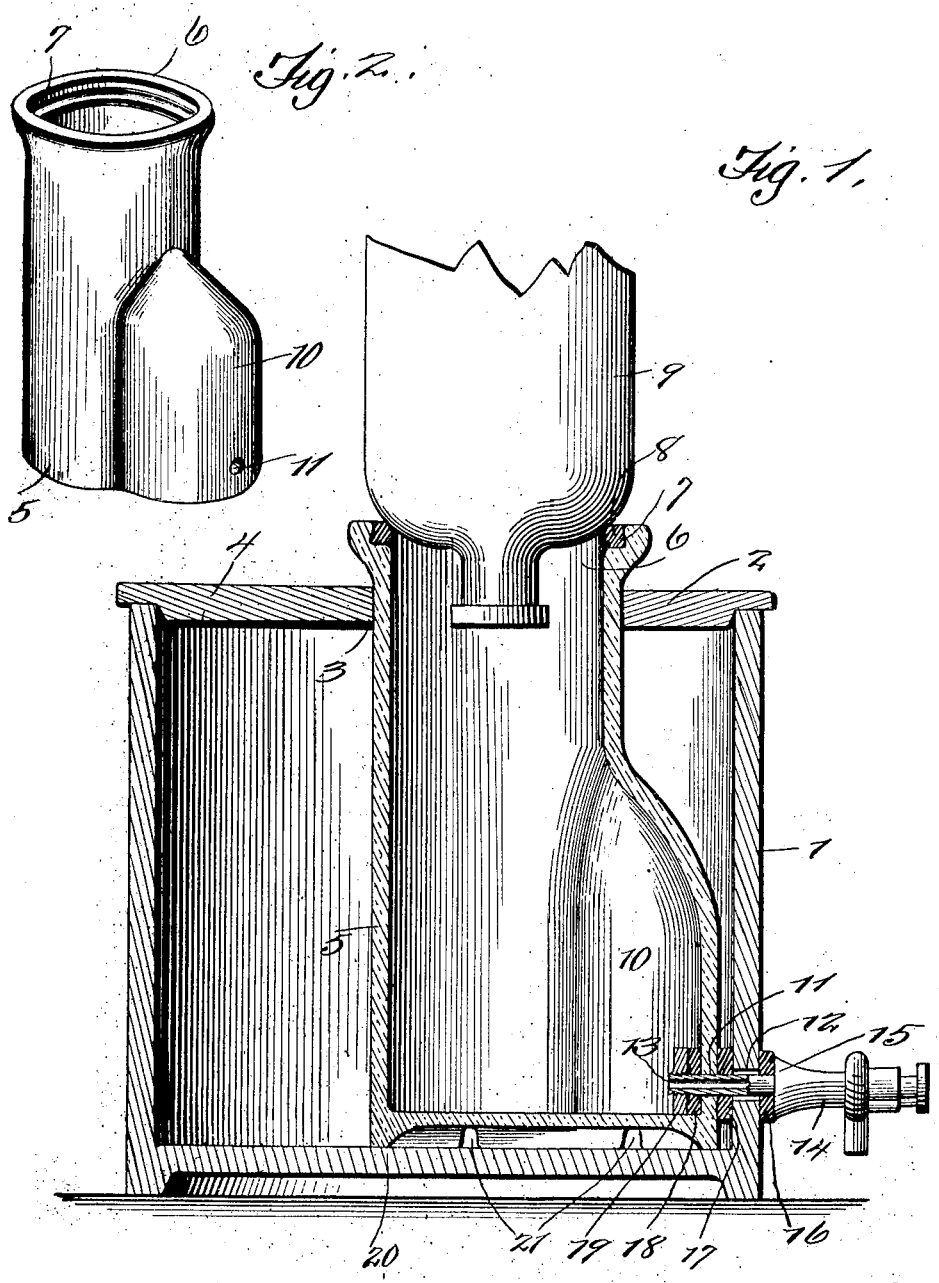
Witnesses
Inventor
Henry G. Cordley

UNITED STATES PATENT OFFICE.

HENRY GREELEY CORDLEY, OF GLENRIDGE, NEW JERSEY.

WATER-COOLER.

No. 882,552.  Specification of Letters Patent.  Patented March 24, 1908.

Application filed December 19, 1906. Serial No. 348,630.

*To all whom it may concern:*

Be it known that I, HENRY GREELEY CORDLEY, a citizen of the United States, residing at Glenridge, in the county of Essex, State of New Jersey, have invented certain new and useful Improvements in Water-Coolers, of which the following is a description, reference being had to the accompanying drawings, forming a part hereof.

My invention relates to water coolers of the type in which the water to be cooled is contained in an open-mouthed jar placed within an outer receptacle which is adapted to be filled with ice, the jar being provided with means extending through the wall of the outer receptacle for drawing off the water as desired, the mouth of the jar being adapted to receive the neck of an inverted water bottle from which water is supplied to the jar as it is drawn off.

In water coolers of this type difficulty is found in securing tight joints between the drawing off device and both the inner jar and the outer receptacle without complicated and expensive constructions.

It is the object of my present invention to provide a construction of the inner jar by which a drawing off device of simple and inexpensive construction shall be adapted to readily and firmly unite the inner jar and the outer receptacle and make a liquid tight joint with each, while at the same time the mouth of the jar is properly located with reference to the outer receptacle, the form of the inner jar being such that in addition to the above enumerated advantages a largely increased cooling surface is procured at the lower end of the jar and in proximity with the ice and cold water therefrom, whereby the water within the jar is more effectively cooled.

With this object in view my invention consists in the construction and combination of elements hereinafter described and particularly pointed out in the claims.

Referring to the drawings,—Figure 1 is a vertical sectional view through a cooler embodying my invention, and Fig. 2 is a perspective view, on a reduced scale, of the inner jar.

In the drawings, 1 is the outer receptacle preferably formed of water-proofed fiber having a cover provided with an opening 3 to receive the top of the inner jar.

It will be understood that the cover is made in two parts 2 and 4, the division being at a line passing diametrically through the upper end of the jar; whereby the jar may be placed in position within the outer receptacle, and one of the cover portions, for example the part 4, may be readily removed for the introduction of ice into said outer receptacle.

5 is the inner or water containing jar having open mouth 6 preferably provided with recess 7 to receive a ring 8 of rubber or similar material and adapted to receive the mouth and neck of a water bottle 9. The opening 3 in the cover 2 is arranged near the center of the cover so that the weight of the inner jar and the water bottle shall fall nearly in line with the center of the receptacle so as to reduce as much as may be the liability of the receptacle to be overturned.

The jar 5 is provided on one side in its lower portion with a bulged portion 10 extending nearly to the inner periphery of the outer receptacle 1. The bottom of the jar 5 is supported at a short distance from the bottom of the receptacle 1, as by the rib 20 having openings or passages at 21, through which the cold water resulting from the melting of the ice may find its way beneath the jar 5, whereby additional cooling surface is secured. In the bulge 10 is formed an opening 11 adapted to receive the tube of the draining-off device. In the wall of the outer receptacle is formed an opening 12. Through the openings 12 and 11 extends the screw-threaded tube 13 of a drawing-off device or faucet 14. The faucet 14 is provided with shoulder 15 outside the outer receptacle. Between this shoulder 15 and the outer wall of the outer receptacle 1 is placed a washer 16, preferably of rubber. Within the outer receptacle and between it and the exterio of the inner jar 5 on the tube 13 is usually placed a washer 17 preferably of rubber, although such washer may not be necessary in all cases, and within the inner jar 5 on the tube 13 is placed a washer 18 preferably of rubber, and a nut 19.

The washer and nut being placed as described all that is necessary in order to secure the inner jar 5 in place and secure such joints between the parts as will prevent leakage from the inner jar to the receptacle and outward from the receptacle is to rotate the drawing-off device or faucet 14 until the washers 16, 17 and 18 are so tightly compressed as to prevent the possibility of leakage.

The bulged portion 10 extends upward for a part only of the height of the jar 3 so that there is sufficient space for free circulation of the cold water formed from the melting of the ice in the outer receptacle, and it will be seen that the bulged portion of the jar, in addition to its function in connection with the drawing-off device or faucet, largely increases the surface of the jar in contact with the ice and cold water therefrom, and that the cold water may also enter the space beneath the jar; by both of which features the cooling surface of the inner jar is largely increased.

I claim,—

1. In a water cooler, an outer receptacle provided with a cover having an opening therein near its center, and provided also with an opening in its side wall near its bottom, in combination with an inner or water containing jar having its upper portion cylindrical and adapted to receive an inverted water bottle, and having its lower portion provided on one side with a bulged portion 10 extending to the bottom of the jar so as to afford an extended base for the jar, and having an opening therein near its bottom, the jar being arranged with its base resting on the bottom of the outer receptacle with its cylindrical portion extending through the opening in the cover and adapted to support the water bottle with its center of gravity near the center of the outer receptacle, and having its bulged portion extending approximately to the wall of the outer receptacle, and a draw off tube extending through the openings in the outer receptacle and inner jar and serving to secure the jar in position, substantially as described.

2. In a water cooler, an outer receptacle provided with a cover having an opening therein near its center, and provided also with an opening in its side wall near its bottom, in combination with an inner or water containing jar having its upper portion cylindrical and adapted to receive an inverted water bottle, and having its lower portion provided on one side with a bulged portion 10 extending to the bottom of the jar so as to afford an extended base for the jar, and having an opening therein near its bottom, the jar being arranged with its base resting on the bottom of the outer receptacle with its cylindrical portion extending through the opening in the cover and adapted to support the water bottle with its center of gravity near the center of the outer receptacle, and having its bulged portion extending approximately to the wall of the outer receptacle, and a faucet having its draw off tube screw threaded and extending through the openings in the wall of the outer receptacle and in the bulged portion of the jar and having a shoulder in contact with the exterior of the outer receptacle, and a nut on the inner end of the draw off tube, the shoulder and nut on the draw off tube serving to clamp the jar in position, substantially as described.

This specification signed and witnessed this tenth day of December A. D. 1906.

HENRY GREELEY CORDLEY.

In the presence of—
JOHN STEINHAUSER,
GEORGE A. BOTE.